US012754389B2

(12) United States Patent
Chalk et al.

(10) Patent No.: US 12,754,389 B2
(45) Date of Patent: Oct. 6, 2026

(54) INTERMITTENTLY BONDED OPTICAL FIBER RIBBON AND METHOD OF PREPARING SAME

(71) Applicant: CORNING RESEARCH & DEVELOPMENT CORPORATION, Corning, NY (US)

(72) Inventors: Julie Ann Chalk, Hickory, NC (US); David Wesley Chiasson, Edmonton (CA); Jeffrey Dean Danley, Hickory, NC (US); Gregory Alan Mills, Clemmons, NC (US); Christopher Mark Quinn, Hickory, NC (US); Zhaoxu Tian, Hickory, NC (US); Bin Yang, Shenzhen (CN); Xiaomin Zhao, Hickory, NC (US)

(73) Assignee: CORNING RESEARCH & DEVELOPMENT CORPORATION, Corning, NY (US)

(*) Notice: Subject to any disclaimer, the term of this patent is extended or adjusted under 35 U.S.C. 154(b) by 324 days.

(21) Appl. No.: 18/653,166

(22) Filed: May 2, 2024

(65) Prior Publication Data

US 2024/0280779 A1 Aug. 22, 2024

Related U.S. Application Data

(63) Continuation of application No. PCT/US2022/048682, filed on Nov. 2, 2022.

(Continued)

(51) Int. Cl.
*G02B 6/44* (2006.01)

(52) U.S. Cl.
CPC ............ *G02B 6/448* (2013.01); *G02B 6/443* (2013.01); *G02B 6/4482* (2013.01)

(58) Field of Classification Search
CPC ........................................................ G02B 6/448
See application file for complete search history.

(56) References Cited

U.S. PATENT DOCUMENTS

| | | | |
|---|---|---|---|
| 9,703,064 | B2 | 7/2017 | Chalk et al. |
| 10,409,017 | B2 | 9/2019 | Chiasson et al. |

(Continued)

FOREIGN PATENT DOCUMENTS

| | | | |
|---|---|---|---|
| EP | 1202097 | A2 | 5/2002 |
| WO | 2019/142842 | A1 | 7/2019 |

(Continued)

OTHER PUBLICATIONS

Extended European search report, EP application No. 22896322.9, dated Sep. 10, 2025, 11 pages, European Patent Office.

(Continued)

*Primary Examiner* — Rhonda S Peace
(74) *Attorney, Agent, or Firm* — Thomas R. Irwin

(57) ABSTRACT

Embodiments of the disclosure relate to an optical fiber ribbon. The optical fiber ribbon includes a plurality of subunits each including a subunit coating of a first material surrounding at least one optical fiber. The optical fiber ribbon also includes a ribbon matrix of a second material disposed around the plurality of subunits. A plurality of bonds are intermittently formed between adjacent subunits of the plurality of subunits. Each bond is formed by an interaction of the second material with the first material for the purpose of creating a first level of adhesion between the first and second materials at an outer surface of the subunit coating. The second material is inhibited from interacting with the first material in regions between the plurality of bonds along a length of the optical fiber ribbon to create a second level of adhesion that is less than the first level of adhesion.

20 Claims, 8 Drawing Sheets

Related U.S. Application Data

(60) Provisional application No. 63/280,686, filed on Nov. 18, 2021.

(56) References Cited

U.S. PATENT DOCUMENTS

| | | | | |
|---|---|---|---|---|
| 11,953,749 | B2 * | 4/2024 | Kondapalli | G02B 6/4403 |
| 11,960,137 | B2 * | 4/2024 | Sahoo | G02B 6/562 |
| 12,353,041 | B2 * | 7/2025 | Chalk | G02B 6/4403 |
| 2013/0156390 | A1 | 6/2013 | Matsuzawa et al. | |
| 2019/0285823 | A1 | 9/2019 | Tanaka et al. | |
| 2021/0181442 | A1 * | 6/2021 | Sato | G02B 6/4409 |
| 2022/0043227 | A1 * | 2/2022 | Blazer | G02B 6/4403 |
| 2023/0273390 | A1 * | 8/2023 | Chalk | C03C 25/1065 385/114 |

FOREIGN PATENT DOCUMENTS

| | | | |
|---|---|---|---|
| WO | 2021/133534 | A1 | 7/2021 |
| WO | 2022/086700 | A1 | 4/2022 |

OTHER PUBLICATIONS

International Search Report and Written Opinion of the International Searching Authority; PCT/US2022/048682; dated Feb. 9, 2023; 8 pages; US Patent Office.

* cited by examiner

INTERMITTENTLY BONDED OPTICAL FIBER RIBBON AND METHOD OF PREPARING SAME

PRIORITY APPLICATION

This application is a continuation of International Patent Application No. PCT/US2022/048682, filed Nov. 2, 2022, which claims the benefit of priority of U.S. Provisional Application No. 63/280,686, filed on Nov. 18, 2021, the content of which is relied upon and incorporated herein by reference in its entirety.

BACKGROUND

The disclosure relates generally to optical fiber ribbons, and specifically to optical fiber ribbons in which the optical fibers are intermittently bonded together along the length of the optical fiber ribbon. A single optical fiber cable may contain many optical fibers (indeed, hundreds of optical fibers), and during installation of a fiber optic cable network, managing the connections between the optical fibers can be difficult. Thus, various portions of the optical fiber cable, such as individual optical fibers, buffer tubes, or groups of ribbons, may be color coded for the purposes of identification when making such connections. Further, the optical fiber cable may contain optical fibers arranged in ribbons to allow for multiple optical fibers to be grouped and to be fusion spliced together in a single operation. Arranging optical fibers into ribbons may lead to larger cable designs than if the optical fibers were loosely contained within the optical fiber cable.

SUMMARY

According to an aspect, embodiments of the disclosure relate to an optical fiber ribbon. The optical fiber ribbon includes a plurality of subunits each including a subunit coating surrounding at least one optical fiber. The subunit coating is made of a first material. The optical fiber ribbon also includes a ribbon matrix disposed at least partially around the plurality of subunits. The ribbon matrix is made of a second material. A plurality of bonds are intermittently formed between adjacent subunits of the plurality of subunits. Each bond of the plurality of bonds is formed by an interaction of the second material with the first material for the purpose of creating a first level of adhesion between the first and second materials at an outer surface of the subunit coating of each subunit of the plurality of subunits. The second material is inhibited from interacting with the first material in regions between the plurality of bonds along a length of the optical fiber ribbon to create a second level of adhesion that is less than the first level of adhesion between the first and second materials. The regions are located within a lateral area of at least one subunit of the adjacent subunits.

According to another aspect, embodiments of the disclosure relate to a method of preparing an optical fiber ribbon. In the method, a first plurality of subunits are arranged adjacent to each other. Each subunit of the first plurality of subunits includes at least one optical fiber surrounded by a subunit coating made of a first material, and the subunit coating has a layer of cure inhibited resin. A non-bonding region is intermittently formed along edges of a second plurality of subunits in which the second plurality of subunits is a subset of the first plurality of subunits. A ribbon matrix made of a second material is applied over the first plurality of subunits. The ribbon matrix is cured such that the second material interacts with the cure inhibited outer resin of the first material in bonding regions located intermittently between the non-bonding regions.

According to a further aspect, embodiments of the disclosure relate to an optical fiber cable. The optical fiber cable includes a cable jacket having an inner surface and an outer surface. The inner surface defines a central cable bore and the outer surface defining an outermost surface of the optical fiber cable. At least one optical fiber ribbon is disposed within the central cable bore. Each of the at least one optical fiber ribbon is configured to convert between a planar configuration and a non-planar configuration. Each of the at least one optical fiber ribbon includes plurality of subunits in which each subunit of the plurality of subunits includes at least one optical fiber surrounded by a subunit matrix material. A ribbon matrix material is disposed at least partially around the plurality of subunits, and the ribbon matrix material interacts to create a first level of adhesion with the subunit matrix material in bonding regions and interacts with the subunit matrix material to create a second level of adhesion less than the first level in non-bonding regions. The bonding regions and non-bonding regions are provided in alternating arrangement between adjacent subunits of the plurality of subunits along a length of the at least one optical fiber ribbon.

Additional features and advantages will be set forth in the detailed description that follows, and, in part, will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

BRIEF DESCRIPTION OF THE DRAWINGS

The accompanying drawings are included to provide a further understanding and are incorporated in and constitute a part of this specification. The drawings illustrate one or more embodiment(s), and together with the description serve to explain principles and the operation of the various embodiments.

DETAILED DESCRIPTION

Referring generally to the figures, various embodiments of an optical fiber ribbon having intermittent bonding regions between subunits as well as methods for producing such an optical fiber ribbon are provided. As described herein, the intermittently bonded optical fiber ribbon includes optical fibers arranged in subunits having a subunit coating, and bonds are intermittently formed between the subunits using a ribbon matrix material. The ribbon matrix material is applied continuously along the length of the optical fiber ribbon, but the ribbon matrix material is prevented from bonding to the subunit coating in regions between the intermittently-formed bonds. In particular, the subunit coating is applied to the sets of optical fiber ribbons and inhibited from fully curing at the outer surface of the subunit. The cured inhibited subunit coating is masked or removed along lateral edges of the subunits to prevent the ribbon matrix material from chemically and/or physically interacting with the subunit coating in these regions. Thus, the intermittent bonds are formed where the subunit coating and the ribbon matrix material are allowed to interact. Advantageously, forming the intermittent bonds in this way allows for the implementation of intermittently bonded optical fiber ribbons with relatively minor modification to existing processing lines for formation of conventional optical fiber ribbons, and the masking or ablating of the subunit material can be performed at relatively high line speeds. Each of these exemplary embodiments will be described in greater detail below, and these exemplary embodiments are provided by way of illustration, and not by way of limitation. These and other aspects and advantages will be discussed in relation to the embodiments provided herein.

Figure 1:
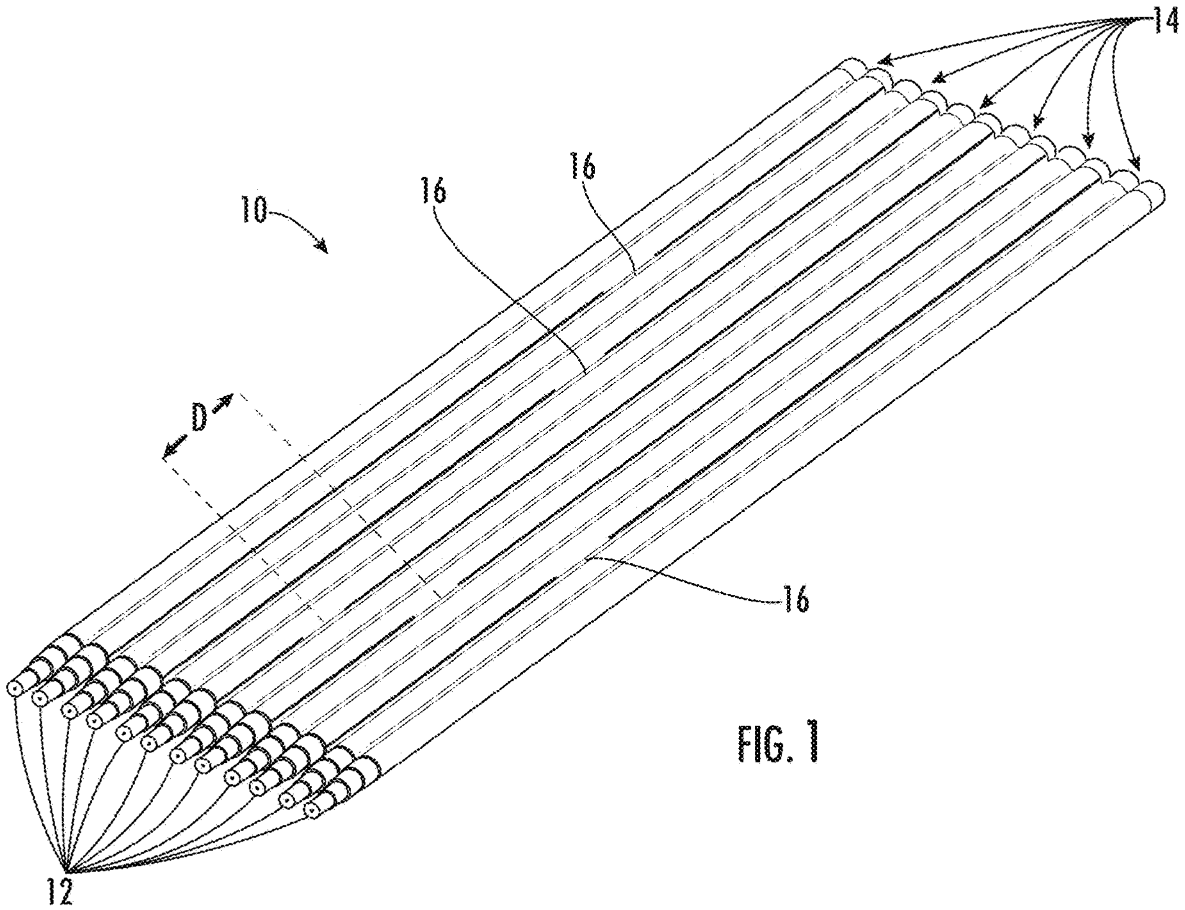
FIG. 1 is partial, perspective view of an intermittently bonded optical fiber ribbon, according to an exemplary embodiment.

FIG. 1 depicts an exemplary embodiment of an optical fiber ribbon 10 according to the present disclosure. The optical fiber ribbon 10 includes a plurality of optical fibers 12. In the embodiment depicted, the optical fiber ribbon 10 includes twelve optical fibers 12. In embodiments, the number of optical fibers 12 contained in the optical fiber ribbon 10 varies from, e.g., four to thirty-six. In certain embodiments, the optical fibers 12 are grouped into subunits 14 having one or more optical fibers 12. In the embodiment shown in FIG. 1, the subunits 14 each include two optical fibers 12. Thus, for example, in the embodiment of FIG. 1, the optical fibers 12 are arranged into six subunits 14. In an example embodiment, the optical fiber ribbon 10 includes twelve optical fibers 12 with two six-fiber subunits 14, and in another example embodiments, the optical fiber ribbon includes twenty-four optical fibers 12 with two twelve-fiber subunits 14. The optical fibers 12 of each subunit 14 are bonded to each other along the length of the optical fiber ribbon 10, but the subunits 14 are only intermittently bonded along the length of the optical fiber ribbon 10.

FIG. 1 depicts intermittent bonds 16 staggered along the length of the subunits 14. The intermittent bonds 16 between two adjacent subunits 14 may be spaced apart by distance D of, e.g., 15 mm to 200 mm. In embodiments, the optical fiber ribbon 10 has a first configuration in which the optical fibers 12 are arranged in a substantially planar row, which helps to organize the optical fibers 12 for mass fusion splicing. Further, as will be described more fully below, the subunits 14 also can be rolled, curled, folded, twisted, or bundled into a non-planar configuration (e.g., a circle or spiral) for space-saving packaging in an optical fiber cable, especially optical fiber cables having a circular cross-section. The optical fibers 12 of the optical fiber ribbon 10 are able to transition from the first configuration to the second configuration because the subunits 14 are only held together intermittently along the length of the optical fiber 10 by the intermittent bonds 16.

In a conventional optical fiber ribbon, each optical fiber is bonded to its neighboring optical fiber(s) along the entire length of the optical fiber ribbon to hold them in the planar configuration. According to the present disclosure, however, the fiber subunits 14 are bonded intermittently along the length of the optical fiber ribbon 10 so that the optical fibers 12 are not rigidly held in the planar configuration. In between the intermittent bonds 16, the subunits 14 are not bonded or are not strongly bonded to each other along their length. Regarding the latter point, the subunits 14 may be weakly bonded to each other during manufacturing in which the optical fiber ribbon 10 may be maintained in the planar configuration, but the weak bonding between the subunits 14 is broken when the optical fiber ribbon 10 is rolled, curled, folded, twisted, or bundled into a non-planar configuration. In this way, the present optical fiber ribbon 10 provides the advantages of a ribbon with respect to fiber organization and mass fusion splicing while also allowing the optical fiber ribbon 10 to curl, roll, fold, bundle, or laterally compress across the width of the ribbon allowing for a more compact cable design.

Figure 2A:
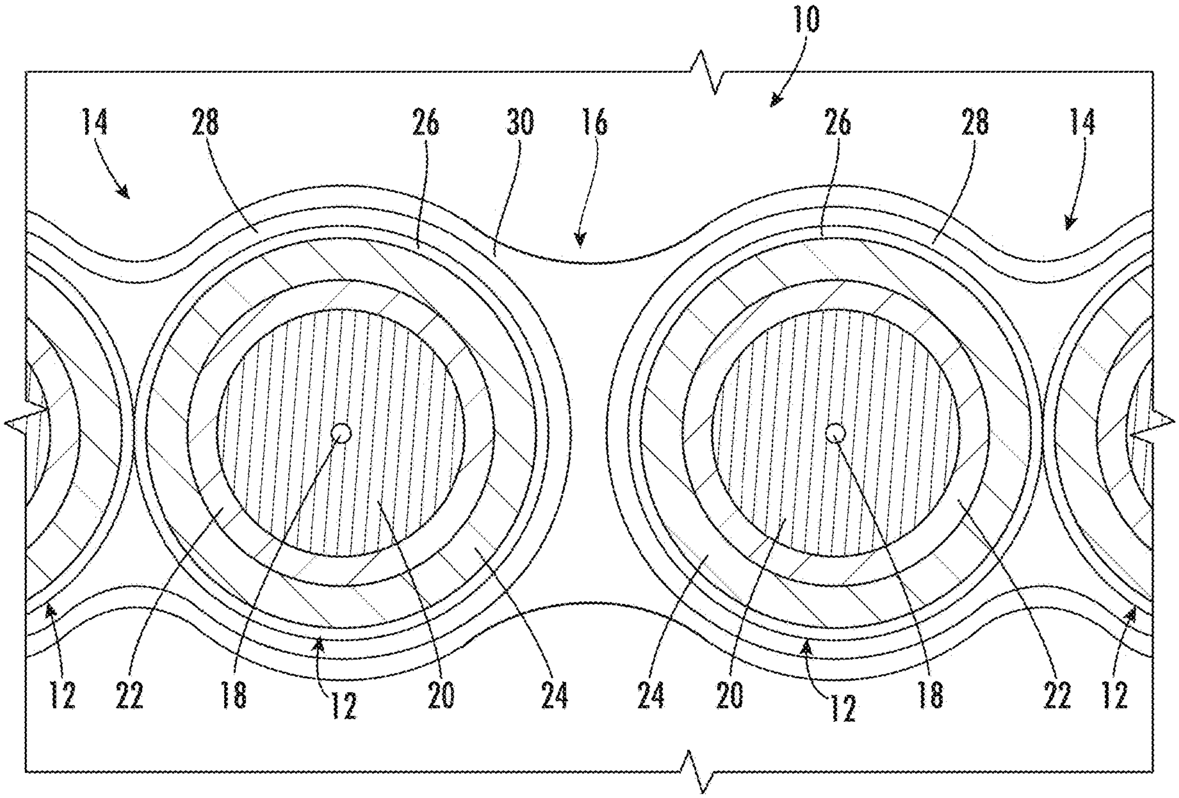
FIGS. 2A and 2B depict partial cross-sectional views between subunits of the optical fiber ribbon of FIG. 1 at a location of an intermittent bond (FIG. 2A) and at a location of a non-bonding region (FIG. 2B), according to an exemplary embodiment.

FIG. 2A depicts a cross-sectional view of an intermittent bond 16 between two optical fiber subunits 14. In the embodiment depicted in FIG. 2A, each subunit 14 includes two optical fibers 12. In one or more embodiments, the optical fibers 12 each include a core 18 surrounded by a cladding 20. In embodiments, the cladding 20 is surrounded by one or more coating layers, such as primary coating 22, secondary coating 24, and ink coating 26. In one or more embodiments, the ink coating 26 (if provided) is the outermost surface of the optical fiber 12 in which case the optical fiber 12 is a colored optical fiber 12. In such embodiments, the ink coating 26 may be used for identification purposes. In particular, each optical fiber 12 in the optical fiber ribbon 10 may be provided with a specific color, and the optical fibers 12 in the optical fiber ribbon 10 may be presented in a specific order based on their color, especially for the purpose of identification during splicing (e.g., mass fusion splicing of two optical fiber ribbons 10). For example, one convention for color-coding the optical fibers 12 is to arrange them in the following color sequence: blue, orange, green, brown, slate, white, red, black, yellow, violet, rose, and aqua. In embodiments containing more than twelve optical fibers 12, the pattern of colors may be repeated, and optionally, in the second sequence, a stripe may be added to provide differentiation from the first sequence of colors.

In one or more embodiments, the secondary coating 24 is the outermost surface of the optical fiber 12 in which case the optical fiber 12 is considered a bare optical fiber 12. In one or more embodiments, the core 18 and cladding 20 are glass materials, and the primary coating 22, secondary coating 24, and ink coating 26 are curable resin materials.

As can be seen in FIG. 2A, the optical fibers 12 in each subunit 14 may be touching, or in other embodiments, the optical fibers 12 in each subunit 14 may be separated by a space of no more than one and a half times the diameter of the optical fibers 12 within the ribbon 10. Further, in embodiments, a gap between adjacent subunits 14 may be up to 100 μm, or in other embodiments, there may be no gap between adjacent subunits 14. To join the optical fibers 12 into subunits 14, a subunit matrix material 28 is provided at least partially around the optical fibers 12. In embodiments, the subunit matrix material 28 has a minimum thickness of up to 20 μm. The minimum thickness will generally be located at or proximal to the positions around the optical fiber 12 normal to a plane defined by the adjacent optical fibers 12 of the subunit 14.

The subunit matrix material 28 is a curable resin, in particular a UV curable resin. In one or more embodiments, the subunit matrix material is comprised of one or more urethane acrylate oligomers, one or more epoxy acrylate oligomers, one or more acrylate monomers, one or more photoinitiators, an antioxidant, and/or other typical processing additives. Further, in one or more embodiments, the subunit matrix material 28 has a Young's modulus of from 25 MPa to 1300 MPa, an elongation at break of from 10% to 200%, a specific gravity of 0.9 to 1.2, a tensile strength of 10 MPa to 40 MPa, and/or a viscosity in the range from 100 cP to 8000 cP at 25° C. In one or more embodiments, the subunit matrix material 28 includes a colorant so as to identify the optical fiber ribbon 10 amongst a group of optical fiber ribbons.

At the location of each intermittent bond 16 between adjacent subunits 14, the subunit matrix material 28 is surrounded by a ribbon matrix material 30. The ribbon matrix material 30 is a curable resin, in particular a UV curable resin. In one or more embodiments, the ribbon matrix material 30 is comprised of one or more urethane acrylate oligomers, one or more acrylate monomers, one or more photoinitiators, and an antioxidant, amongst other possible additives. In one or more embodiments, the ribbon matrix material 30 comprises a Young's modulus of 1 MPa to 500 MPa, an elongation at break of at least 200%, a viscosity lower than 8000 cP at 25° C., and/or a glass transition temperature (after cure) in the range of −40° C. to 50° C.

To provide a strong bond between the subunit matrix material 28 and the ribbon matrix material 30 in the region of the intermittent bond 16, the subunit matrix material 28 is cured on its interior, but an outer layer of the subunit matrix material 28 remains uncured or is inhibited from fully curing prior to application of the ribbon matrix material 30. As used herein, "uncured" or "cure inhibited" means not cured or not fully cured and, thus, encompasses partially cured subunit matrix material 28. In one or more embodiments, a matrix material is considered "cured" if at least 95% of the subunit matrix material 28 has reacted. Further, in one or more embodiments, the outer layer is uncured or cure inhibited if 50% or less of the outer layer has reacted. In one or more embodiments, the subunit matrix material 28 is cured in an oxygen rich environment, which creates a nano-layer (e.g., 50 nm to 2000 nm) of uncrosslinked (i.e., unreacted) ribbon matrix material 28 at the outer surface of the subunit matrix material 28. After the ribbon matrix material 30 is applied to the subunit matrix material 28, the curing of the ribbon matrix material 30 creates a strong bond with the uncured or cure inhibited outer surface of the subunit matrix material 28.

Figure 2B:
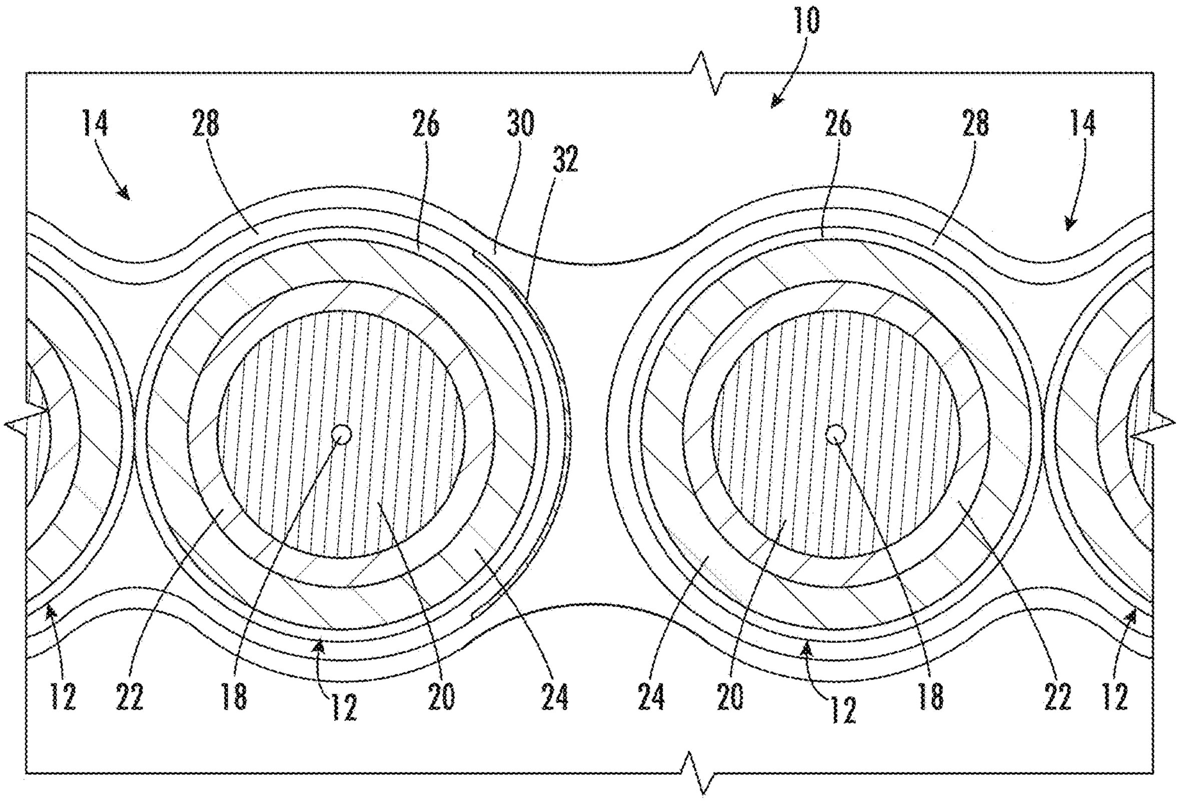

FIG. 2B depicts a cross-sectional view between two subunits 14 at a location between two intermittent bonds 16. Between intermittent bonds 16, the ribbon matrix material 30 is prevented from interacting with the uncured or cure inhibited outer surface of the subunit matrix material 28 to form a strong bond. Formation of a strong bond can be prevented by masking or removing the nano-layer of uncured or cure inhibited outer surface of the subunit matrix material 28. In FIG. 2B, this region where the formation of a strong bond is prevented is illustrated as a non-bonding region 32. In one or more embodiments, the non-bonding layer 32 is formed by covering the nano-layer with a non-bonding material, such as ink, gas, soot, a low cohesive strength material, or low viscosity liquid. In one or more embodiments, the non-bonding region 32 is formed by laser ablating of the nano-layer of uncured or cure inhibited subunit matrix material 28.

In one or more embodiments, the intermittent bonds 16 between two particular subunits are longitudinally spaced apart by a distance D of 15 mm to 200 mm, in particular 30 mm to 150 mm, and most particularly 70 mm to 80 mm, along the length of the optical fiber ribbon 10. In one or more embodiments, the length of each intermittent bond 16 is up to 0.2D. Thus, the non-bonding regions 32 extend for a distance of about 15 mm to about 200 mm, and the intermittent bonds 16 form bonding regions in which the ribbon matrix material 30 interacts with the subunit matrix material 28 that extend for up to about 20% of that distance.

Figure 3:
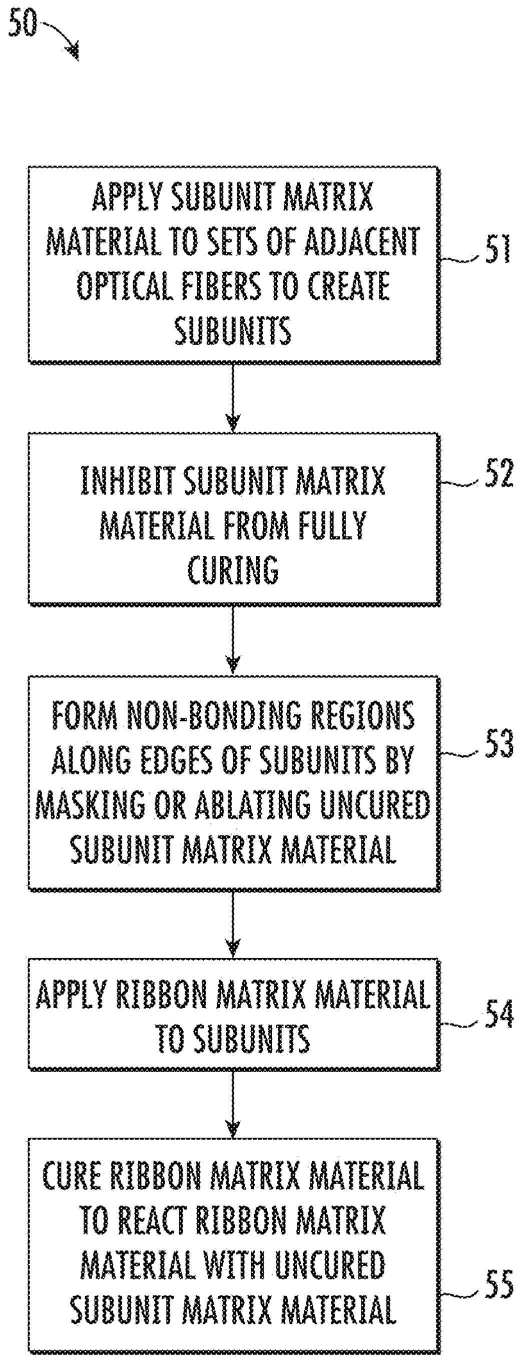
FIG. 3 provides a process flow diagram for a method of preparing an intermittently bonded optical fiber ribbon, according to an exemplary embodiment.

FIG. 3 provides a flow diagram of an exemplary method 50 of manufacturing an intermittently bonded optical fiber ribbon 10 according to the present disclosure. In a first step 51 of the method 50, two or more optical fibers 12 are arranged adjacent to each other and run through a first applicator. The first applicator deposits the subunit matrix material 28 around the optical fibers 12 to join the optical fibers 12 into a subunit 14. In one or more embodiments, the first applicator applies the subunit matrix material 28 substantially continuously along the length of the optical fibers 12.

In a second step 52, the bulk of the subunit matrix material 28 is cured but an outer layer of the subunit matrix material 28 is inhibited from curing. In one or more embodiments, the subunit matrix material 28 is UV curable, and the subunit matrix material 28 is exposed to UV light to promote curing of the subunit matrix material 28. However, in one or more embodiments, the curing takes place in an oxygen-rich environment, which inhibits curing in a nano-layer at the outer surface of the subunit matrix material 28. In the nano-layer of uncured subunit matrix material 28, there are unterminated peroxyl radicals, which will create strong adhesion with the subsequently applied curable primary matrix material 32 unless such nano-layer is removed or masked.

Figure 4:
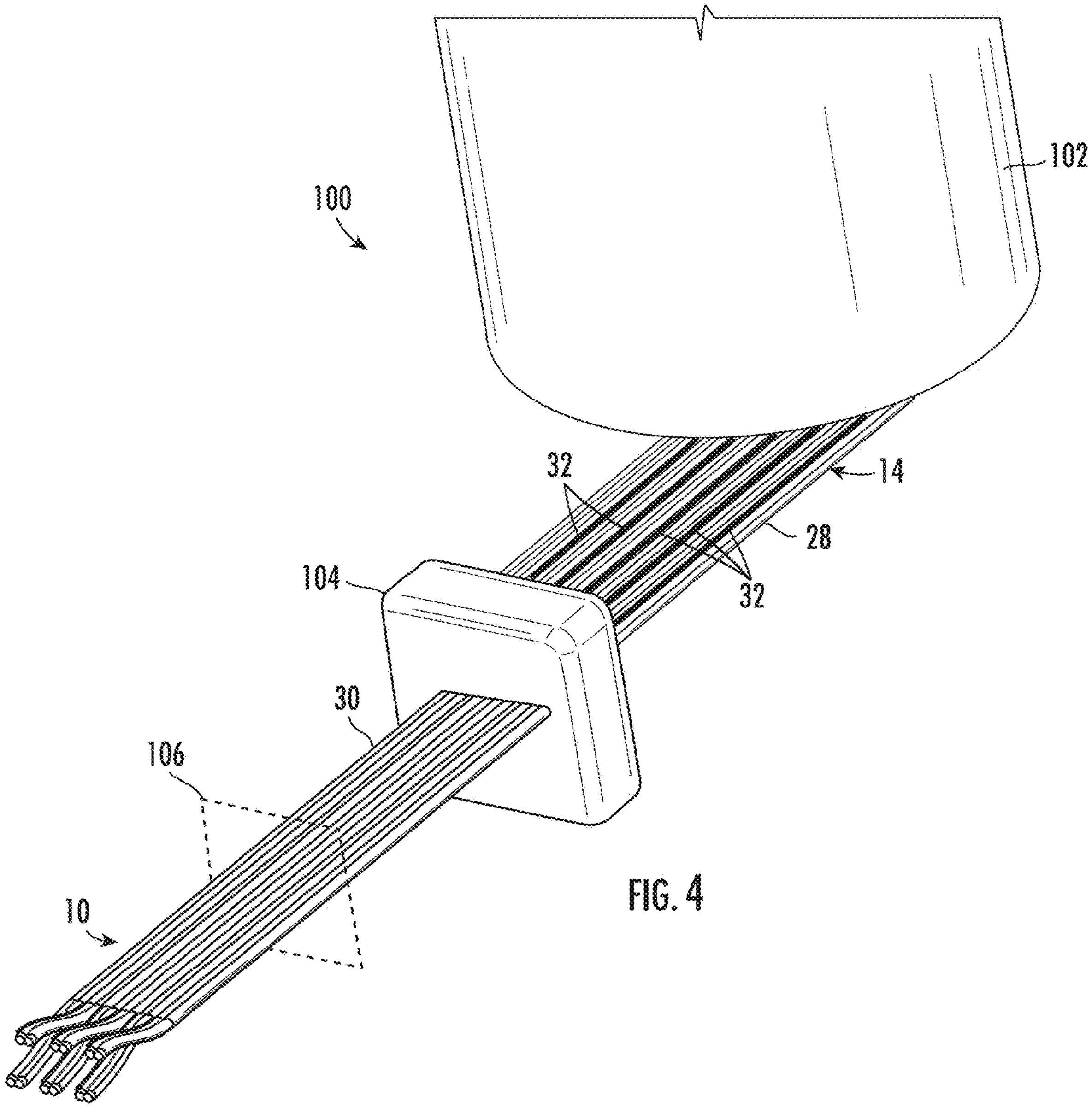
FIG. 4 depicts a schematic representation of a system for preparing an intermittently bonded optical fiber ribbon, according to an exemplary embodiment.

In a third step 53, the non-bonding regions 32 of the subunits 14 are formed along at least one lateral edge of at least one subunit 14 of two adjacent subunits 14. FIG. 4 depicts an embodiment of a system 100 for carrying out the third and subsequent steps of the method 50 of intermittently bonding subunits 14 of the optical fiber ribbon 10. In one or more embodiments, the system 100 includes a device 102 for ablating or masking the uncured subunit matrix material 28 on the outer surface of the subunit 14. In one or more embodiments, the device 102 deposits ink, gas, soot, a low cohesive strength material, or a low viscosity liquid onto the subunit 14. For example, if the device 102 deposits ink, the device 102 may be an inkjet printer nozzle or array of inkjet printer nozzles. In one or more embodiments, the device 102 ablates the uncured subunit matrix material 28, and in such embodiments, the device 102 may be a laser or plasma nozzle or an array of lasers or plasma nozzles. Examples of suitable lasers that can be used to ablate the uncured subunit matrix material 28 include UV lasers (in particular an exciplex laser) and $CO_2$ lasers. In one or more embodiments, the lasers can be steered with galvanometer, polygon, or mask projection. Further, in one or more embodiments, the laser beam has a width of 10 microns to 300 microns. Additionally, the laser may be pulsed to create discontinuous dots to adjust the level of bonding/non-bonding between the subunit matrix material 28 and the ribbon matrix material 30.

In order to control formation of the non-bonding region 32, the subunits 14 are arranged on their side (i.e., with the optical fibers 12 of the subunit 14 vertically stacked) when passing under the device 102. In this way, the masking material or ablated region can be accurately placed to prevent a strong interaction between the ribbon matrix material 30 and the subunit matrix material 28. That is, bonding regions will be created between regions of ablation or masking material, and the bonding regions will allow for interaction (physical and/or chemical) between the subunit matrix material 28 and the ribbon matrix material 30 at a first level of adhesion, and non-bonding regions will be created by the regions of ablation or masking material that inhibit the interaction (physical and/or chemical) between the subunit matrix material 28 and the ribbon matrix material 30. Thus, in the non-bonding regions, the level of adhesion between the subunit matrix material 28 and the ribbon matrix material 30 will be at a second level that is less than the first level.

As shown in FIG. 4, the device 102 ablates or masks the edge of the subunit 14 in the region between the intermittent bonds 16 (shown as the black stripes along the edge of the subunits 14). In one or more embodiments, the device 102 ablates a width of the subunit edge, and because of the curvature of the subunit edge, there will be a variation in the amount of ablation across the subunit edge. Maximum ablation will occur at the edge surface nearest to the laser (e.g., a midpoint of the subunit edge), trailing off to either side of the subunit edge. Also, it is noted that one subunit 14 does not need to have any masking material applied or uncured region ablated because the application of masking material or ablation of uncured region from the adjacent subunit 14 will allow for intermittent bonding with the subunit 14 at the lateral edge of the optical fiber ribbon 10.

After passing under the device 102, the subunits 14 are rotated 90° so that the optical fibers 12 of the subunits 14 are arranged horizontally and so that the subunits 14 are in a substantially planar configuration. Thereafter, in a fourth step 54, the subunits 12 pass through a second applicator 104, which deposits the ribbon matrix material 30 over the subunit matrix material 28. In one or more embodiments, the ribbon matrix material 30 completely surrounds the subunits 14 so as to form a substantially continuous matrix coating around the subunits 14. In one or more other embodiments, the ribbon matrix material 30 covers a top half of the subunits 14, and in still one or more other embodiments, the ribbon matrix material 28 covers as little as about an eighth of each subunit 14 (e.g., spanning about 45° of an outer surface of the subunit matrix material 28).

In a fifth step 55, the ribbon matrix material 30 is cured. As shown in FIG. 4, the system 100 includes a curing station 106 which exposes the ribbon matrix material 30 to UV or IR light, elevated temperature, and/or water vapor to promote curing. During curing, the ribbon matrix material 30 interacts with the regions of uncured subunit matrix material 28 that have not been masked or ablated away. Thus, after curing, the intermittent bonds 16 are formed.

While the foregoing discussion related specifically to optical fiber ribbons 10 including intermittently bonded subunits 14, the optical fiber ribbon 10 can include a combination of intermittently bonded subunits 14 and optical fibers 12 or just intermittently bonded optical fibers 12. As mentioned above, the optical fibers 12 include curable coatings, including the secondary coating 24 and the ink coating 26. When formed as the outermost surface of the optical fiber 12, either of these coatings 24, 26 can be inhibited from fully curing so as to form an uncured layer at the outer surface of the optical fiber 12. Thereafter, a portion of the uncured coating 24, 26 is masked or ablated, and the ribbon matrix material 30 is applied around the optical fibers 12. Where the uncured coating 24, 26 is located, the ribbon matrix material 30 will form strong intermittent bonds 16, and where the uncured coating 24, 26 is masked or ablated, the ribbon matrix material 30 will not bond or will not strongly bond to the coating 24, 26.

Figure 5:
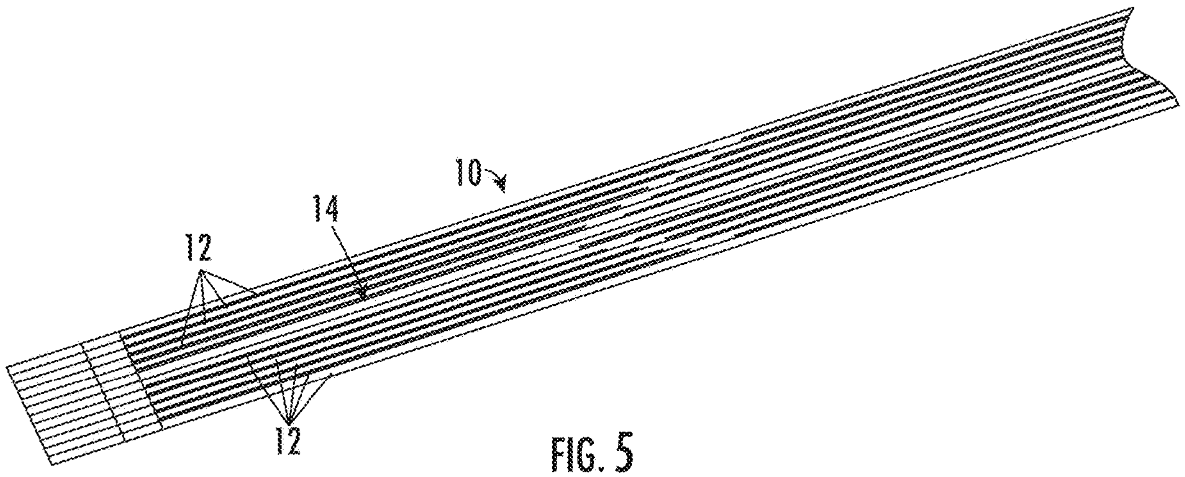
FIGS. 5 and 6 depict an embodiment of an optical fiber ribbon in which the bonding and non-bonding features are selected to provide color-coding identification, according to an exemplary embodiment.
Figure 6:
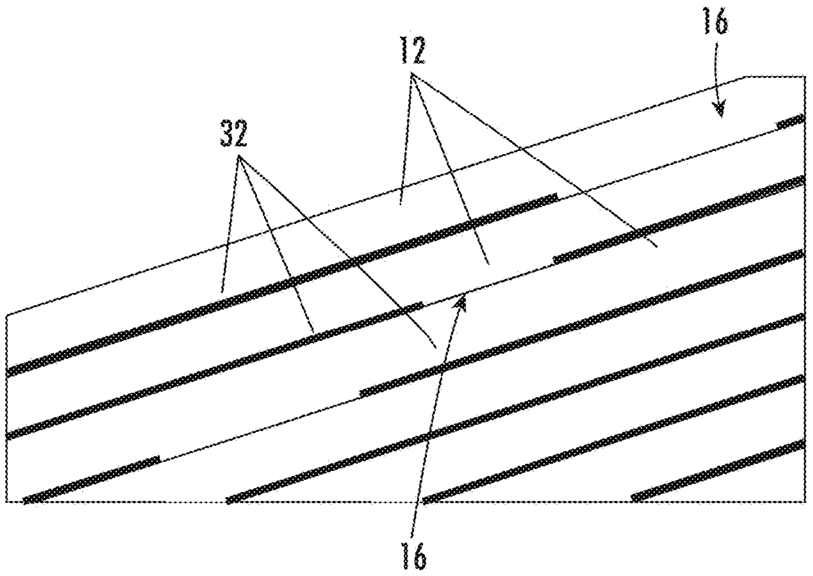

FIGS. 5 and 6 depict an embodiment of an optical fiber ribbon 10 including a central subunit 14 of two optical fibers 12 and five optical fibers 12 intermittently bonded on each side of the central subunit 14. As described above, intermittent bonds 16 can be provided between the ribbon matrix material 30 and the subunit matrix material 28 of the central subunit 14 and the outer coating (secondary coating 24 or ink coating 26) of the optical fiber 12. In one or more other embodiments, each of the individual optical fibers 12 is provided with a coating of the subunit matrix material 28 such that the subunit matrix material 28 joins the center two optical fibers 12 into a subunit but just provides an additional layer of coating outside of the secondary coating 24 or ink coating 28 for the five optical fibers 12 on each side of the central subunit 14. In such embodiments, the subunit matrix material 28 may be color-coded for each ribbon 10 in the ribbon group. Further, in such embodiments, the non-bonding region 32 may be created by applying an ink layer corresponding to the color-coded identification scheme of the individual fibers 12 within the optical fiber ribbon 14. In this way, the optical fiber ribbon 10 shown in FIGS. 5 and 6 provides includes intermittent bonds 16 to facilitate placement of the optical fiber ribbon in a non-planar configuration and incorporates two levels of color-coding identification (i.e., for the ribbon 10 of the ribbon group and for the individual optical fibers 12 within the ribbon 10).

While FIGS. 5 and 6 depict two optical fibers 12 forming a central subunit 14 with five individual optical fibers 12 intermittently bonded on each side of the central subunit 14, the number of subunits 14 and individual optical fibers 12 can vary, including the extremes of no subunits 14 and all individual optical fibers 12 and all subunits 14 and no individual optical fibers 12. In a particular example, the optical fiber ribbon 10 includes twenty-four optical fibers 12 with two twelve-fiber subunits 14 that are intermittently bonded along their lengths. The intermittent bonding essentially provides a perforation to separate the optical fiber ribbon 10 having twenty-four optical fibers 12 into two twelve-fiber optical fiber ribbons 10.

Further, while the embodiment of FIGS. 5 and 6 was described as providing color coding features for forming the intermittent bonds 16, other embodiments may utilize any of the other previously discussed masking or ablative features to form the non-bonding region between the subunits 14 and/or individual optical fibers 12.

Figure 7:
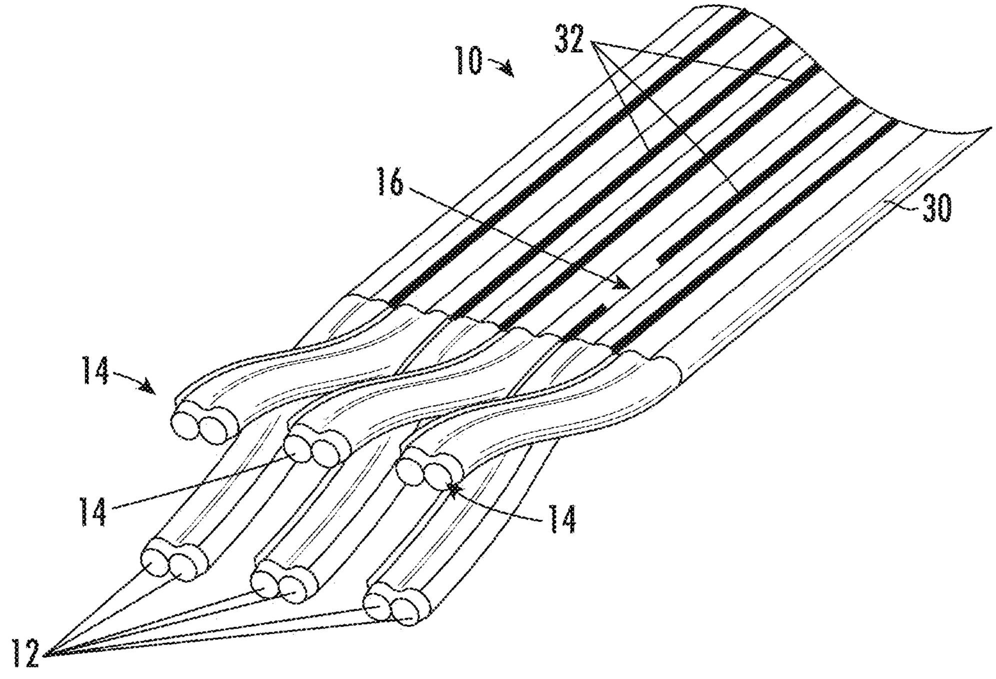
FIGS. 7 and 8 depict perspective views of an end of an optical fiber ribbon in which the subunits have been separated, according to exemplary embodiments.
Figure 8:
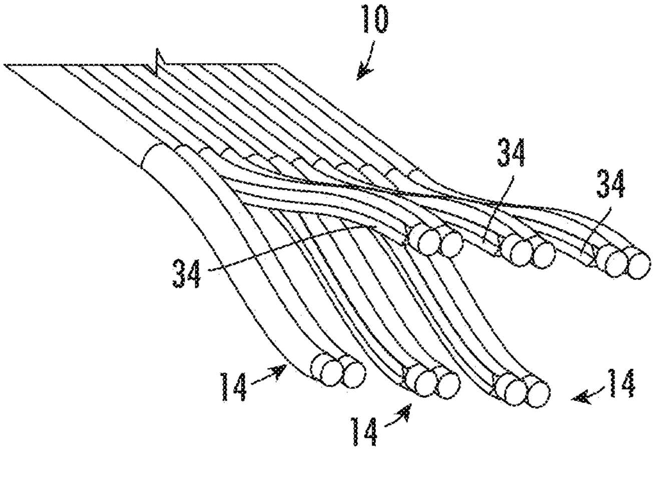

FIGS. 7 and 8 depict an end of the optical fiber ribbon 10 in which the subunits 14 are separated along non-bonding regions 32. As shown in these figures, the location of the non-bonding region 32 allows for the ribbon matrix material 30 to tear between the subunits 14 in such a manner that the interstitial material 34 between the subunits 14 remains with one subunit 14. That is, the interstitial material 34 is not loose upon separation of the subunits 14 but is attached to one of the two adjacent subunits 14. By remaining attached to one of the subunits 14, the interstitial material 34 will not require collection after application of the ribbon matrix material 30, will not disrupt downstream processing of the optical fiber ribbon 14 (e.g., by coming loose in the machinery), and will not create congestion in the optical fiber cable in which the optical fiber ribbon 10 is incorporated.

Figure 9:
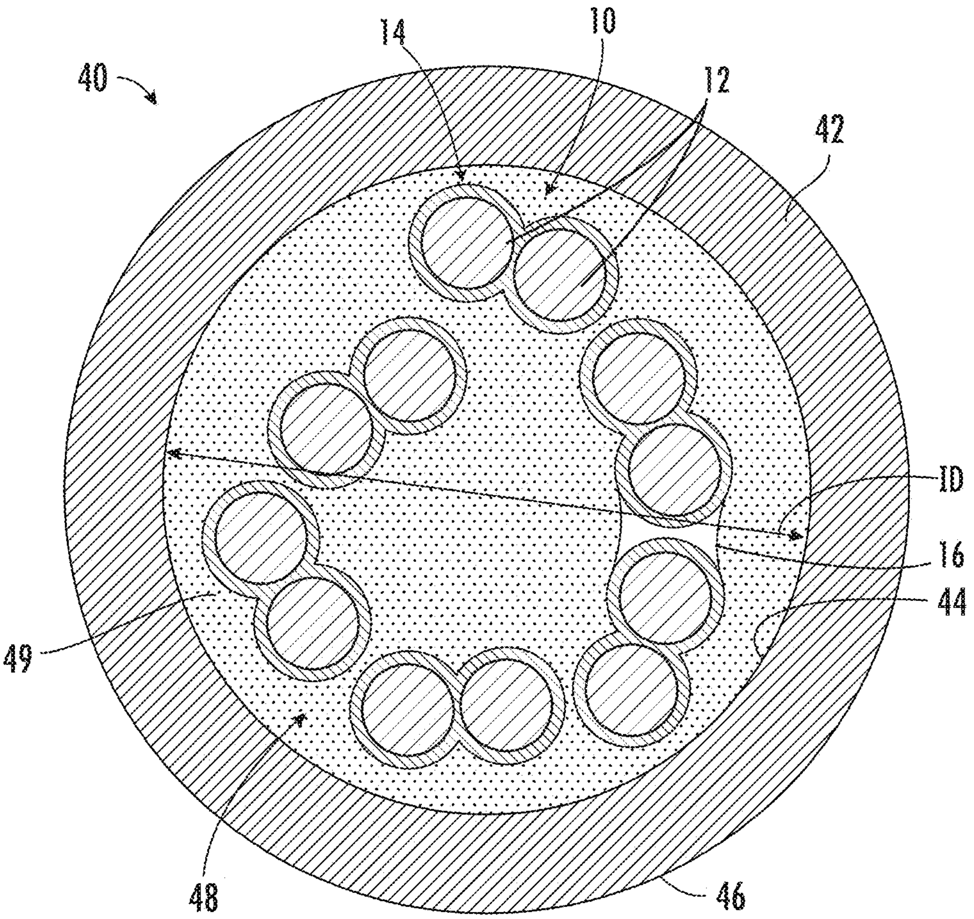
FIG. 9 depicts an optical fiber cable including an intermittently bonded optical fiber ribbon collapsed in a non-planar configuration, according to an exemplary embodiment.

As mentioned above, the intermittently bonded optical fiber ribbon 10 allows for smaller cable diameters and/or higher fill ratios. FIG. 9 depicts an exemplary embodiment of an optical fiber cable or buffer tube 40 containing an intermittently bonded optical fiber ribbon 10. The optical fiber cable 40 has a cable jacket 42 with an inner surface 44 and an outer surface 46. The inner surface 44 defines a central bore 48 containing the optical fiber ribbon 10. The central bore 48 has a diameter, which is the inner diameter ID of the cable jacket 42. As shown in FIG. 9, the central bore 48 is also filled with filling material 49, which may be, e.g., strength members (such as aramid, cotton, basalt, and/or glass yarns), water blocking gels or powders, and/or fire retardant materials, among others.

Conventionally, the inner diameter of the cable jacket had to be at least as large as the width of the optical fiber ribbon in the planar configuration in order to accommodate the entire optical fiber ribbon. However, this meant that much of the interior space of the optical fiber jacket went unfilled. According to the present disclosure, smaller cable diameters and/or higher fiber density ratios are achievable by reducing the maximum cross-sectional dimension of the optical fiber ribbon 10. In particular, by laterally compressing the ribbon by rolling, curling, or folding the optical fiber ribbon 10, the inner diameter ID of the cable 40 can be smaller, providing an overall smaller and more densely filled cable design. Notwithstanding, the optical fiber ribbon 10 can still be removed from the optical fiber cable 40, flattened into the planar configuration, and then easily be mass fusion spliced like a conventional optical fiber ribbon. For the sake of simplicity, a single optical fiber ribbon 10 was shown in the optical fiber cable 40. However, in other embodiments, the optical fiber cable 40 may contain several tens or hundreds of optical fiber ribbons 10. Further, such optical fiber ribbons 10 may be arranged in one or more groupings (e.g., surrounded by a thin film, binder thread, tape, etc.) within the central bore 48 of the cable jacket 42.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. An optical fiber ribbon, comprising:

a plurality of subunits each comprising a subunit coating surrounding at least one optical fiber, the subunit coating comprising a first material;

a ribbon matrix disposed at least partially around the plurality of subunits, the ribbon matrix comprising a second material;

a plurality of bonds intermittently formed between adjacent subunits of the plurality of subunits;

wherein each bond of the plurality of bonds is formed by an interaction of the second material with the first material for creating a first level of adhesion between the first and second materials at an outer surface of the subunit coating of each subunit of the plurality of subunits; and wherein the second material is inhibited from interacting with the first material in regions between the plurality of bonds along a length of the optical fiber ribbon to create a second level of adhesion that is less than the first level of adhesion between the first and second materials, the regions being located within a lateral area of at least one subunit of the adjacent subunits.

2. The optical fiber ribbon of claim 1, wherein the regions between the plurality of bonds comprise a masking material disposed between the first material and the second material to inhibit the interaction of the first and second materials.

3. The optical fiber ribbon of claim 2, wherein the masking material comprises at least one of ink, soot, or a low cohesive matrix.

4. The optical fiber ribbon of claim 2, wherein the masking material is ink that provides color-coded identification for individual optical fibers of the plurality of subunits.

5. The optical fiber ribbon of claim 2, wherein the first material comprises an outer layer of cure inhibited resin and the masking material is cured resin.

6. The optical fiber ribbon of claim 1, wherein the first material comprises an outer layer of cure inhibited resin and wherein the regions between the plurality of bonds are formed by at least partial removal of the outer layer of cure inhibited resin.

7. The optical fiber ribbon of claim 1, wherein the regions between the plurality of bonds extend for a distance (D) of 15 mm to 200 mm.

8. The optical fiber ribbon of claim 7, wherein each bond of the plurality of bonds has a length of up to 0.2D.

9. The optical fiber ribbon of claim 1, wherein the first material is a UV curable resin.

10. The optical fiber ribbon of claim 9, wherein the UV curable resin comprises one or more urethane acrylate oligomers, one or more acrylate monomers, one or more photoinitiators, and an antioxidant.

11. The optical fiber ribbon of claim 10, wherein the UV curable resin comprises at least one of a Young's modulus of 1 MPa to 500 MPa, an elongation at break of at least 200%, a viscosity lower than 8000 cP at 25° C., or a glass transition temperature after cure in a range of −40° C. to 50° C.

12. A method of preparing an optical fiber ribbon, comprising:

arranging a first plurality of subunits adjacent to each other, each subunit of the first plurality of subunits comprising at least one optical fiber surrounded by a subunit coating comprising a first material, the subunit coating having an outer layer of cure inhibited resin;

intermittently forming a non-bonding region along edges of a second plurality of subunits, the second plurality of subunits being a subset of the first plurality of subunits;

applying a ribbon matrix comprising a second material over the first plurality of subunits; and curing the ribbon matrix such that the second material interacts with the outer layer of cure inhibited resin of the first material in bonding regions located intermittently between the non-bonding regions.

13. The method of claim 12, wherein the subset of the first plurality of subunits is all but one subunit of the first plurality of subunits, the one subunit being positioned on a lateral side of the optical fiber ribbon.

14. The method of claim 12, wherein each subunit of the first plurality of subunits comprises at least two optical fibers and wherein, prior to intermittently forming, the first plurality of subunits are arranged so that the at least two optical fibers are stacked perpendicular to a plane defined by the adjacent arrangement of the first plurality of subunits.

15. The method of claim 12, wherein intermittently forming further comprises ablating cure inhibited resin from the edges of the second plurality of subunits.

16. The method of claim 12, wherein intermittently forming further comprises depositing an ink or soot onto the edges of the second plurality of subunits.

17. The method of claim 12, wherein intermittently forming further comprises jetting a gas or low viscosity liquid onto the edges of the second plurality of subunits.

18. The method of claim 12, further comprising the steps of:

arranging one or more optical fibers adjacent to each other in a planar configuration;

apply the first material to the one or more optical fibers to form the first plurality of subunits;

curing the first material in an oxygen-rich environment to create the outer layer of cure inhibited resin.

19. An optical fiber cable, comprising:

a cable jacket comprising an inner surface and an outer surface, the inner surface defining a central cable bore and the outer surface defining an outermost surface of the optical fiber cable;

at least one optical fiber ribbon disposed within the central cable bore, wherein each of the at least one optical fiber ribbon is configured to convert between a planar configuration and a non-planar configuration and wherein each of the at least one optical fiber ribbon comprises:

a plurality of subunits, each subunit of the plurality of subunits comprising at least one optical fiber surrounded by a subunit matrix material;

a ribbon matrix material disposed at least partially around the plurality of subunits, wherein the ribbon matrix material interacts to create a first level of adhesion with the subunit matrix material in bonding regions and interacts with the subunit matrix material to create a second level of adhesion less than the first level of adhesion in non-bonding regions;

wherein the bonding regions and non-bonding regions are provided in alternating arrangement between adjacent subunits of the plurality of subunits along a length of the at least one optical fiber ribbon.

20. The optical fiber cable of claim 19, wherein the non-bonding regions comprise a masking material disposed between the subunit matrix material and the ribbon matrix material.

* * * * *